July 15, 1969

L. C. ARNOLD 3,454,982

APPARATUS FOR SHIRRING SYNTHETIC SAUSAGE CASINGS

Filed July 13, 1966

INVENTOR.
LIONEL C ARNOLD

BY

July 15, 1969 L. C. ARNOLD 3,454,982
APPARATUS FOR SHIRRING SYNTHETIC SAUSAGE CASINGS
Filed July 13, 1966 6 Sheets-Sheet 2

LIONEL C ARNOLD
*INVENTOR.*

BY *his Attorney*

LIONEL C ARNOLD
*INVENTOR.*

July 15, 1969     L. C. ARNOLD     3,454,982
APPARATUS FOR SHIRRING SYNTHETIC SAUSAGE CASINGS
Filed July 13, 1966                                       6 Sheets-Sheet 6

LIONEL C ARNOLD
*INVENTOR.*

BY *Henry J. Mosely*
*his Attorney*

United States Patent Office 3,454,982
Patented July 15, 1969

3,454,982
APPARATUS FOR SHIRRING SYNTHETIC SAUSAGE CASINGS
Lionel C. Arnold, Danville, Ill., assignor to Tee-Pak, Inc., Chicago, Ill., a corporation of Illinois
Filed July 13, 1966, Ser. No. 564,961
Int. Cl. A22c 13/00, 11/00
U.S. Cl. 17—42     7 Claims

ABSTRACT OF THE DISCLOSURE

An apparatus for shirring synthetic tubular sausage casings comprises a plurality of means, such as wheels or belts, having means for applying force equiangularly around the periphery of the casing being shirred and arranged so that the force applying means engages the casing to apply a shirring force along a substantially continuous helical line. The apparatus may include belts or wheels having shirring lugs set at a substantial angle and engaging the periphery of the casing sequentially along a substantially helical line to cause the casing to be shirred in essentially continuous helical pleats.

---

This invention relates to new and useful improvements in the shirring of artificial sausage casings and more particularly to a novel method and apparatus for shirring such casings in a continuous helical shirring pattern.

Artificial sausage casings, particularly casings formed of regenerated cellulose, amylose, collagen, alginates, etc., are prepared as hollow thin-walled tubes of substantially indefinite length. For convenience in handling, these casings are shirred from lengths ranging from 40 to 160 ft. or more down to a shirred compressed length of the order of a few inches.

Artificial sausage casings were first shirred using hand shirring techniques of the type previously used for the shirring of natural casings. The artificial sausage casings were inflated with compressed air and shirred on a hollow tube by hand. The earliest shirring machines duplicated the function of the shirring operator's hand in compressing an inflated casing and forming it into accordion type pleats. An early type shirring machine working on such a principle and the resulting shirred product are shown in Dietrich U.S. Patent No. 2,010,626. In Korsgaard U.S. Patent No. 2,583,654 an improved shirring machine is described having an automatic turret arrangement for essentially continuous, but intermittent shirring operation. The Korsgaard machine, however, is one in which the shirring forces were applied by shirring dogs carried at intervals of about six inches on an endless chain. The shirring dogs would grasp the inflated casing and collapse it into accordion pleats in much the same manner as the hand of a hand shirring operator.

In Blizzard et al. U.S. Patents 2,722,714, 2,722,215, and 2,723,201, there is described an improved shirring method and apparatus in which the casing is inflated over a hollow shirring mandrel and shirred by contact with shirring lugs carried on endless belts. The shirring lugs were closely spaced, e.g., about ¾ inch, and staggered so that the space opposite any given shirring lug would be free from application of any shirring force. This arrangement of shirring belts and lugs usually involved a pair of shirring belts although the use of three or more shirring belts for a similar purpose is disclosed. The improved method and apparatus described in the Blizzard et al. patents resulted in the production of shirred casing which was superior in many respects and represents the process by which a substantial majority of the shirred casing is manufactured throughout the world.

In Matecki U.S. Patents 2,983,949 and 2,984,574, there is shown and described an apparatus for shirring artificial sausage casings which represents a slight modification of the principles set forth in the Blizzard et al. patents. The Matecki patents disclose the use of shirring wheels in place of shirring belts, which has some slight advantage in that shirring wheels are easily molded and are less expensive than shirring belts. Also, the Matecki patents disclose the use of a 3-wheel or 4-wheel shirring arrangement which produces a shirring effect which is essentially identical to that produced by the 3-belt and 4-belt shirring arrangements described in the Blizzard et al. patents.

The shirring processes and apparatus which are described in the prior art and which are in commercial use prior to this invention have had the disadvantage that there was a discontinuity in the application of shirring force to the casing being shirred with the result that irregularities would occur in the formation of shirred pleats of casing. In particular, shirring machines of the type disclosed in the Blizzard et al. and Matecki patents have produced shirred casings in which the casing material is pleated in a form approximating a spiral pleat extending continuously around the casing. The application of shirring forces in the Blizzard et al. and Matecki processes has been intermittent and spaced around the periphery of the casing with the application of shirring force applied at spaced intervals. While these processes and apparatus have produced commercially satisfactory casings it has been considered to be most desirable to develop a shirring method and apparatus in which a shirring force can be applied continuously around the periphery of the casing so that the casing would be formed into a true helical pleat with substantially no intervening folds occurring at pleats between the application of successive shirring forces.

It is therefore one object of this invention to provide a new and improved method and/or apparatus for shirring of artificial sausage casings wherein shirring forces are applied successively to the periphery of an inflated casing along a substantially helical line of application of force.

Another object of this invention is to provide an improved shirred artificial sausage casing having continuous helical pleats.

A feature of this invention is the provision of a new and improved method and/or apparatus in which shirring forces are applied to an inflated artificial sausage casing along substantially helical lines.

Another feature of this invention is the provision of a new and improved shirring method and/or apparatus wherein shirring forces are applied from two or more positions spaced around the periphery of an inflated casing and moved to apply said shirring forces in a continuous helical line on the surface of the casing.

Still another feature of this invention is the provision of a new and improved shirring apparatus having a plurality of shirring wheels positioned around the casing being shirred and having a plurality of lugs or other means for applying a shirring force which are positioned at an angle such that rotation of the shirring wheels will effect the application of shirring forces to the casing along a helical line.

Other objects and features of this invention will become apparent from time to time throughout the specification and claims as hereinafter related.

SUMMARY OF THE INVENTION

This invention comprises a new and improved shirring method and/or apparatus in which an artificial sausage casing is fed over a shirring mandrel and inflated with compressed air. The inflated casing is shirred by application of force from lugs or other means on the surface of shirring wheels or belts positioned equiangularly around the periphery of the casing and arranged to engage the casing to form pleats therein. The lugs or other means for application of shirring forces to the casing, positioned on the wheels or belts, are each positioned at an angle relative to the direction of peripheral movement so that upon movement of the shirring wheels or belts the shirring lugs or other shirring force-applying means are brought successively into engagement with the periphery of the inflated casing. The angle of the shirring lugs or other shirring force-applying means is such that as said lugs or means are moved successively into engagement with the casing they engage the casing along a substantially continuous helical line and thus form substantially continuous helical pleats in the casing. The formation of continuous helical pleats results in shirred strands which are straighter and about 5–10% shorter than those previously produced. The principle of using shirring wheels or belts having the lugs or other shirring force-applying means set at an angle to provide a helical application of shirring force to the casing may be applied in any of a variety of apparatus such as Blizzard et al., 2,722,714, 2,722,715, 2,723,-201, Matecki 2,983,949 and 2,984,574, or Voigt 3,209,399. The novel process and apparatus embodying this invention will be described more fully hereinafter with reference to the various drawings.

In the accompanying drawings, to be taken as a part of this specification, there are clearly and fully illustrated several preferred embodiments of this invention in which drawings.

DESCRIPTION OF THE INVENTION

This invention is based upon my discovery that synthetic sausage casings can be shirred in a more compact straight strand having a more satisfactory distribution of the shirred pleats by application of shirring forces to an inflated casing along a substantially continuous helical line around the casing. Since the improvement of this invention resides in the application of shirring forces along a substantially helical line, only the shirring head portion of the shirring apparatus is shown in the various drawings and only so much of the shirring head as is necessary to illustrate the invention.

Figure 1:
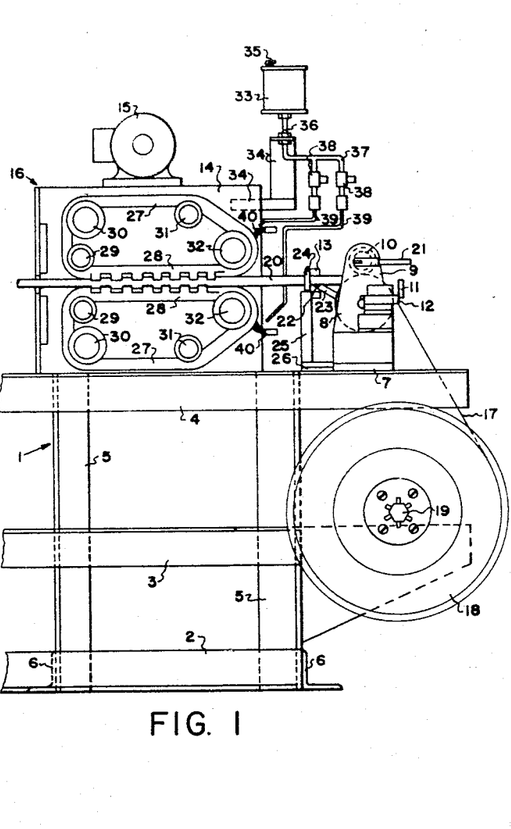
FIG. 1 is a view in elevation of a portion of a shirring machine embodying one form of this invention.

Referring now to FIG. 1 of the drawings, the improved process and apparatus of this invention is illustrated as applied in an apparatus of the type shown in the aforementioned Blizzard et al., patents. In comparing the apparatus of FIG. 1 with the corresponding figure in the Blizzard et al., patents, the same reference numerals are not used for the same parts shown in that patent, but the correspondence of parts and manner of operation will be apparent.

In FIG. 1, the reference character 1 is generally applied to an angle-iron, welded frame which includes a rear bottom longitudinal angle 2, a rear intermediate angle 3, a rear top longitudinal angle 4, and rear upright angles 5. The remaining portions of frame 1 are disclosed in more detail in FIG. 1 of the Korsgaard patent to which reference is made for a more complete understanding of the same.

Frame 1 also includes transversely extending angles 6. Mounted on the rear top angle 4 and on a corresponding angle on the opposite side is plate 7 which carries a measuring roll 8. Measuring roll 8 is rotatably mounted between support plates 9 which also support a rotatable squeeze roll 10. Cooperating with the measuring roll 8 is a metering disc 11 that is arranged to operate a measuring limit switch 12 for stopping further operation of the shirring head when a predetermined length of casing has being shirred.

In the Blizzard et al., and Korsgaard patents, there is explained in greater detail the employment of a tear limit switch for stopping further operation of the shirring head in the event that the casing becomes torn. The tear limit switch is operated by roller 13 which engages the upper side of the casing.

Mounted on the angle iron frame 1 are shirring head side plates 14 which constitute the framework for the shirring head, further details of which will be described hereinafter. Mounted on side plates 14 is a shirring head motor 15 that is suitably controlled for starting, driving, and stopping the shirring head which is generally referred to as 16.

The shirring head 16 is arranged to receive a relatively thin-walled synthetic sausage casing 17 from a reel 18 that is rotatably mounted on shaft 19. As the casing 17 comes from reel 18, it is flat and sometimes referred to as reelstock. The reelstock fed from reel 18 passes between measuring roll 8 and squeeze roll 10 and is inflated by compressed air as shown at 20. The compressed air for inflation of the casing is introduced through a hollow shirring mandrel (not shown) which is inserted within the casing as shown in the Korsgaard and Blizzard et al. patents. It will be observed that the squeeze roll 10 can be positioned by handle 21. Immediately below the roller 13 which operates the tear limit switch and on the underside of the inflated casing 20 is a roller 22 which is carried by arm 23 and is employed to limit the downward movement of roller 13 when the casing is deflated.

The casing is drawn over a mandrel (not shown) which has a central longitudinal aperture through which air flows under a slight pressure to inflate the casing to its full diameter and thus facilitate the shirring operation. The central aperture in the shirring mandrel also provides an opening for introduction of oil or other lubricant into the interior of the casing and also for the introduction of water or steam in certain variations of this process (as in Arnold et al. U.S. Patent 3,222,192) wherein the casing is moistened or humidified during shirring.

The inflated casing 20 is directed into the shirring head 16 between guide rollers 24 which are mounted on vertical supports 25 on the ends of arms 26 secured to and extending from plate 7. Using the shirring head 16 constructed as herein disclosed, and with appropriate changes in the openings in the shirring dogs or lugs it is possible to shirr a variety of sizes of synthetic sausage casings. The casings with which this invention can be employed range in thicknesses from 1 to 4 mils (0.001–0.004 in.) and in lengths from about 30 to 160 ft. or more. While the reel 18 contains an indeterminate length of casing, the casing wound thereon is normally cut into lengths of the order of 30 to 160 ft. depending upon the requirements of the meat packer, which lengths are shirred onto a mandrel by the shirring head 16. The internal diameter of the casing with which this apparatus can be employed ranges from about $16/32$ to $60/32$ inch. While the apparatus is used primarily in the shirring of cellulosic casing, it may be used in the shirring of fibrous casing, amylose or starch film casing, collagen film casing, alginate film casing, microporous plastic casing, etc. The shirring head shown in this figure can be used in conjunction with a turret as described in the Korsgaard patent, or a floating mandrel construction as described in the Dietrich patent or other similar arrangements.

The shirring head 16 includes upper and lower shirring belts 27 which have a plurality of staggered spaced shirring dogs or lugs 28. The shirring belt arrangement and the relationship of the shirring dogs or shirring lugs is shown on a larger scale (relative to FIG. 1) in FIGS. 3, 4 and 5.

The belts are supported on pulleys or wheels 29, 30, 31 and 32. Motor 15 is connected by a drive pulley (not shown) to one of the wheels supporting shirring belt 27 and is operable to drive the belt to shirr the casing 20. The lower shirring belt 27 is driven by a motor pulley arrangement which is not shown but which can be seen in FIG. 1 of the Blizzard et al. patent. The upper and lower shirring belts are driven in coordination with the shirring dogs or lugs 28 arranged to engage and shirr the casing 20 on the shirring mandrel. The shirred casing is eventually severed and compressed on a storage mandrel, or on the outer end of the shirring mandrel where a floating construction is used, and then is discharged to a suitable storage hopper where the shirred strand is removed and placed in a box for shipment.

Figure 3:
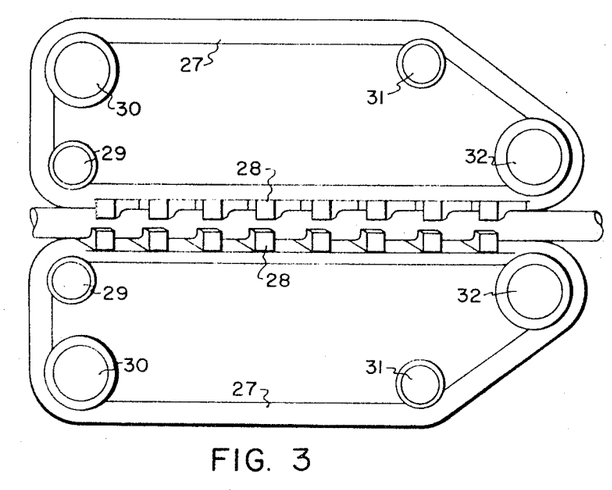
FIG. 3 is a view in elevation, on a slightly larger scale, of the shirring belts used in the apparatus shown in FIG. 1.
Figure 4:
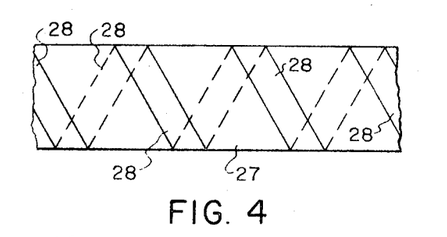
FIG. 4 is a fragmentary plan view of one of the shirring belts of FIG. 3 and showing in dotted line the rotation of the lugs on the cooperating belt.
Figure 5:
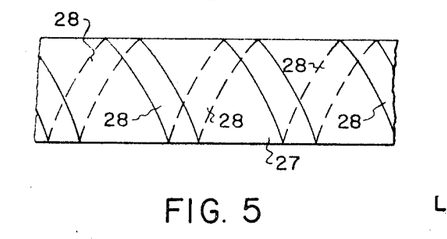
FIG. 5 is a view similar to FIG. 4 illustrating a modification of the shirring lugs.

In FIG. 3 the shirring belt arrangement is shown in a view which is somewhat enlarged in relation to FIG. 1. It will be noted in this drawing that the shirring lugs 28 are set at a substantial angle on the belts 27. The angle of the lugs 28 on each of the belts is in a direction such that the lugs overlap at their respective ends and thus define an area of shirring contact which is substantially helical in form. In FIG. 4 of the drawing, there is shown a plan view of a portion of the lower shirring belt 27 showing lugs 28 set at a substantial angle. In dotted lines in FIG. 4 there is also shown the position of shirring lugs 28 in the upper shirring belt 27 showing the manner in which the lugs overlap to define a substantially helical rib or continuous lug for engaging the casing along a helical shirring line. In FIG. 5, there is shown a modification of the shirring belt arrangement in which the shirring lugs 28 are not only set at an angle but are also curved to form a more completely helical continuous rib or lug for application of a helical shirring force. As in FIG. 4, the shirring lugs in FIG. 5 which are shown in full line represent the ones which are seen looking down on the lower belt while the lugs which are in dotted line represent the ones on the upper belt which would meet with the lower lugs.

A lubricant storage tank 33 is supported by plates 34 and secured to shirring head plates 14. The storage tank 33 has an inlet opening 35 and a bottom outlet opening connected to tubing 36 which is in turn connected to a manifold 37. Manifold 37 is connected to valves 38 and outlet tubes 39 which are arranged to supply lubricant to brushes 40 which are positioned for engagement with shirring belts 27. The oil or other lubricant in tank 33 is supplied to brushes 40 for application of lubricant to the outside of the casing during shirring. In an alternate form of the invention, as described in Arnold et al. U.S. Patent 3,222,192, storage tank 33 may contain water for application to brushes 40 to moisten the casing during shirring.

In the operation of the improved process of this invention, the casing 20 is fed through the shirring head and shirred by the apparatus. The casing is accurately metered by rolls 8 and 10 (the drive mechanism for metering roll 8 is not shown) and is inflated by compressed air introduced through the shirring mandrel. The inflated casing passes over the shirring mandrel and is grasped by the angularly disposed shirring lugs 28 on shirring belts 27. As previously described, shirring lugs 28 grasp the inflated casing along a substantially helical point of contact and cause the casing to be shirred in substantially continuous helical folds. The application of shirring force by shirring lugs 28 is along a substantially helical line around the periphery of the casing and causes the casing to be shirred in substantially continuous helical pleats.

Figure 2:
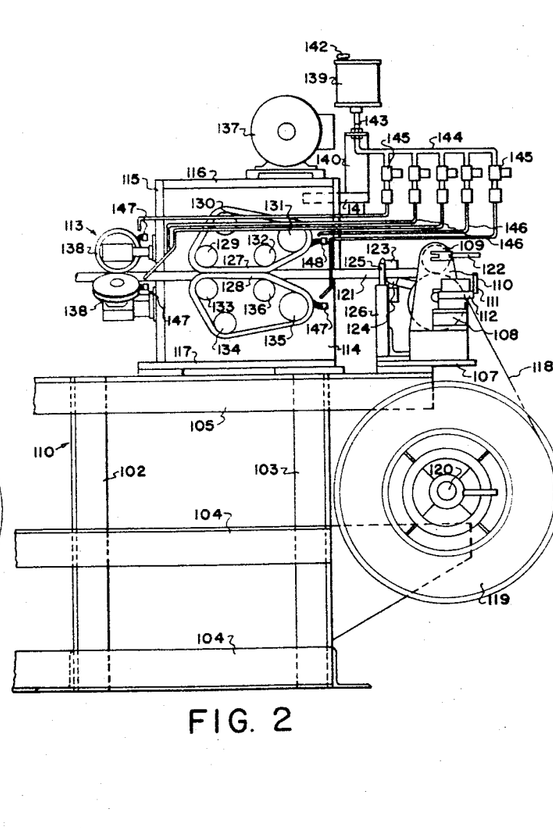
FIG. 2 is a view in elevation of another embodiment of the shirring machine shown in FIG. 1, substituting shirring wheels or rolls for shirring belts.

In FIG. 2 of the drawings, the principle of application of shirring force along substantially helical lines of contact is applied to a shirring machine using shirring wheels in place of the shirring belts shown in FIG. 1. The apparatus is otherwise very similar to that shown and described in FIG. 1.

In this embodiment of the shirring machine, there is provided a supporting frame 101 which is generally of an angle iron and plate welded construction. Frame 101 includes vertically extending angles 102 and 103 and horizontally extending angles 104. At the upper edge of frame 101 there are provided supporting angles 105 on which there is supported plate 107 carrying measuring roll 108 and squeeze roll 109. Rolls 108 and 109 are mounted on support plates 110. Measuring roll 108 is arranged to operate metering disc 111 which cooperates with a measuring limit switch 112 for stopping further operation of the shirring head after a predetermined length of casing has been shirred.

In this embodiment of the invention, the shirring head 113 is supported by upwardly extending plates 114 and 115 and horizontally extending supporting plates 116 and 117. Shirring head 113 is arranged to receive relatively thin walled synthetic sausage casing 118 from reel 119 which is rotatably mounted on shaft 120. As casing 118 comes from reel 119, it is flat in the form of reelstock and passes between measuring roll 108 and squeeze roll 109, and is inflated as shown at 121. The casing is inflated by compressed air introduced through the shirring mandrel (not shown) as described in connection with FIG. 1. Squeeze roll 109 is adjusted by lever 122 for initial threading of casing into the machine.

The casing is fed over the shirring mandrel (not shown), inflated by compressed air, and passes between upper and lower rollers 123 and 124. Roller 123 operates a tear limit switch which stops the shirring head in the event that the casing becomes torn, and roller 124 limits the downward movement of roller 123 if the casing is deflated. The casing also passes between guide rollers 125 which are mounted on vertically extending arms 126.

The inflated casing 121 next passes between upper and lower feed belts 127 and 128 which cooperate to form a closed circular passage engaging the inflated casing and which assists in feeding the casing to the shirring wheels, as will be subsequently described. Feed belt 127 is guided and driven by rollers 129, 130, 131 and 132. Feed belt 128 is driven in coordination with belt 127 by rollers 133, 134, 135, and 136. The drive rollers for the belts 127 and 128 may be driven by motor 137 mounted on plate 116 at the upper end of shirring head 113 or may be driven by any other motor or suitable power source (not shown). In this embodiment of the apparatus the belts 127 and 128 are used for the dual function of feeding the inflated casing 121 to the shirring wheels and for applying oil or other lubricant or for applying water, for lubricating or moistening the exterior of the casing.

The inflated casing 121 is fed into a plurality of shirring wheels 138 which are mounted on end plate 115. Shirring wheels 138 are driven by motor 137 or by any other suitable power source. Shirring wheels 138 do not show the details of the shirring lugs or shirring teeth, these details being brought out in FIGS. 7 to 13 of the drawings. The casing 121 is shirred on the mandrel by wheels 138 and the shirred product removed by the portion of the apparatus to the left of the shirring wheels, which is not shown.

A storage tank 139 is supported by plates 140 and 141 and is secured on shirring head plates 114. Storage tank 139 has an inlet opening 142 and a bottom outlet opening connected to tubing 143 which is in turn connected to manifold 144. Manifold 144 is connected to a plurality of valves 145 and outlet tubes 146 which are arranged to supply lubricant to brushes 147 which are positioned for engagement with feed belts 127 and 128 and with shirring wheels 138.

Oil and other lubricant, or water for moistening the casing, is placed in storage tank 139 and supplied through tube 143, manifold 144, valves 145, and supply tubes 146 to brushes 147. The lubricant is applied to belts 127 and 128 and to shirring wheels 138 for application to the outer surface of the casing during shirring. If it is desired to moisten the casing during shirring, water may be introduced in the apparatus as described in more detail in U.S. Patent 3,222,192.

Figure 7:
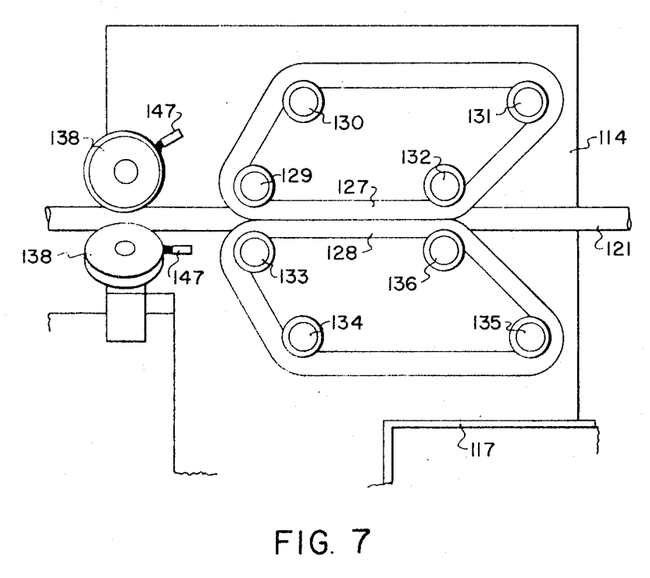
FIG. 7 is a partial elevation, on a slightly larger scale, of the apparatus shown in FIG. 2.

In FIG. 7, the portion of the apparatus shown in FIG. 2 comprising the feed-in belts and shirring wheels is enlarged somewhat in relation to the showing in FIG. 2 for a clearer understanding of the apparatus.

Figure 8:
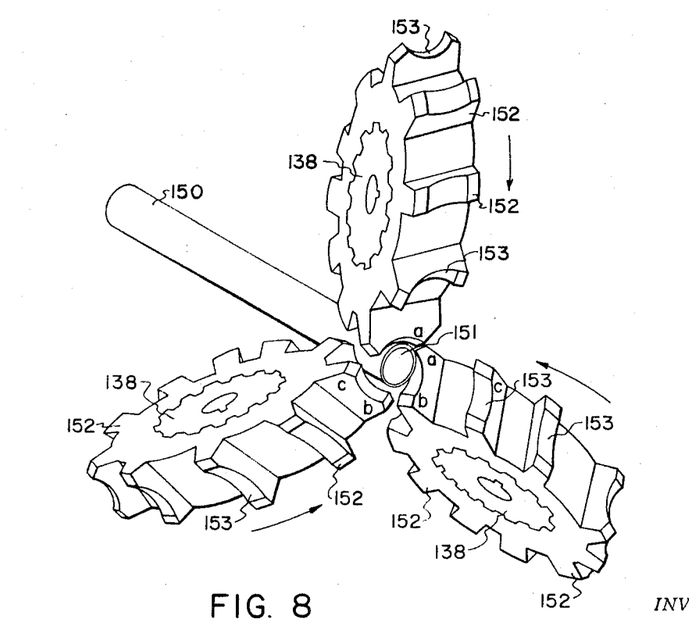
FIG. 8 is an isometric view, on a slightly larger scale, of the shirring wheels and shirring mandrel in the apparatus shown in FIGS. 2 and 7.

In FIG. 8 there is shown an isometric view of the shirring wheels in relation to the shirring mandrel with the casing and the other portions of the appartus removed. The shirring wheels 138 are positioned equiangularly around a shirring mandrel 150. Shirring mandrel 150 is hollow as indicated at 151 for introduction of compressed air and lubricant within the casing being shirred on the mandrel. Shirring wheels 138 each have a plurality of lugs or teeth 152 which are substantially equally spaced and have a cylindrical shirring surface as indicated at 153.

Figure 11:
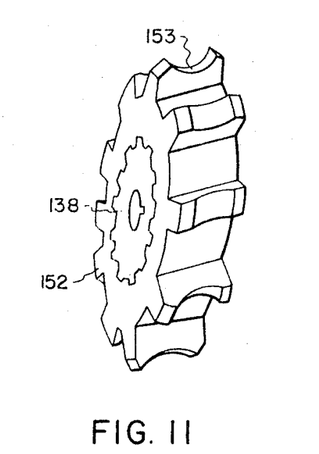
FIG. 11 is an isometric view of one of the shirring wheels shown in FIG. 8.
Figure 12:
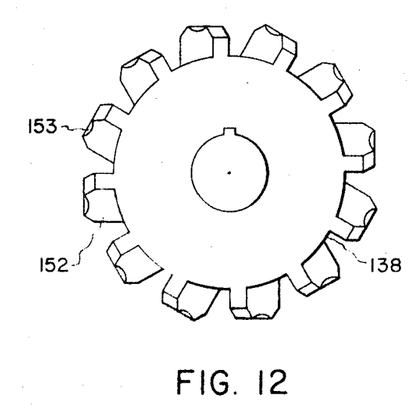
FIG. 12 is a view in side elevation of the shirring wheels shown in FIG. 11.

In FIG. 11 one of the shirring wheels 138 is shown in isometric projection. In FIG. 12 the shirring wheel 138 is shown in side elevation. The shirring lugs 152 are each set at an angle in relation to the shirring mandrel and also at an angle in relation to the peripheral movement of the wheels. The angle of the shirring lugs 152 is such that as wheels 138 are successively rotated the lugs 152 mate successively and define a substantially continuously forming helical surface for application of shirring force to the casing being shirred.

Thus, looking at FIG. 8, it is seen that as the shirring wheels are rotated in the direction of the directional arrows the shirring lugs will meet in a substantially helical pattern. In FIG. 8, the portions of shirring lugs 152 which are labeled *a* are in a mating position. As the rotation of the wheels continues the portions labeled *b* will mate and upon further rotation the portions labeled *c* will mate. Thus, it is seen that the rotation of the shirring wheels causes the angularly set lugs to mate in a substantially continuous helical pattern.

Figure 9:
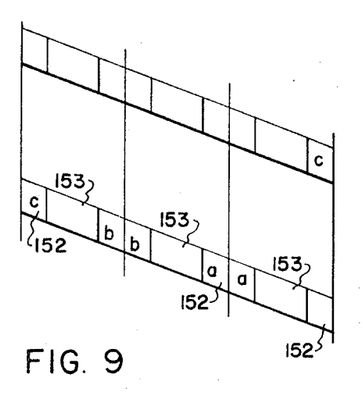
FIG. 9 is a partial development of the shirring wheels shown in FIG. 8.

In FIG. 9, there is shown a development of the lugs 152 showing the successive mating of the outer edges of the lugs. The adjacent portions of the lugs are identified as portions *a*, *b*, and *c*, respectively. The portions *a* correspond to the relationship of the mating edges as shown in FIG. 8. The portions *b* correspond to the next set of mating edges. The portions labeled *c* correspond to portions labeled *c* in FIG. 8.

Figure 10:
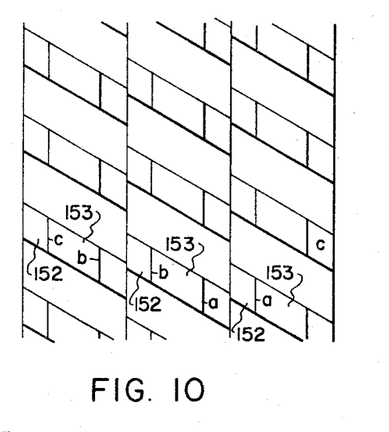
FIG. 10 is a partial development of a modified form of the shirring wheels shown in FIG. 8.

In FIG. 10, there is shown a slight modification of the relative offset of lugs 152 so that the lugs mate at the edges of the shirring surface rather than at the point where the shirring wheels mate, as in FIG. 9. Thus, in FIG. 10 edges *a* on adjacent lugs match, as do edges *b* and edges *c*, rather than having the outer edges of the lugs mate. This arrangement is somewhat preferred since it approaches more nearly a continuous spiral without a break in the application of the shirring force. The arrangement shown in FIGS. 8 and 9 approximate a spiral but there is a very slight offset at the surfaces which actually apply the shirring force.

Figure 13:
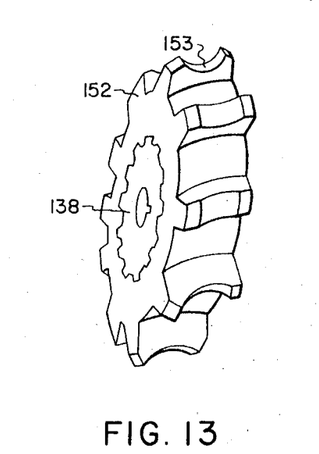
FIG. 13 is an isometric view of a modified form of the shirring wheels shown in FIG. 11.
Figure 14:
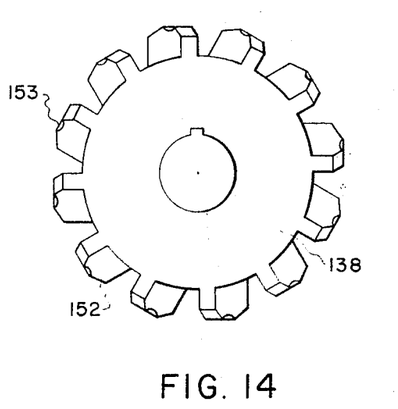
FIG. 14 is a view in side elevation of the shirring wheels shown in FIG. 14.

In FIGS. 13 and 14 there is shown a modified shirring wheel which is substantially the same as those shown in FIGS. 11 and 12. The only difference is that the shirring teeth 152, instead of being cut as flat teeth approximating a spiral, are cut along a true helical curve so that the application of shirring force to the inflated casing follows a true helix rather than an approximate helix as in the other examples.

Figure 17:
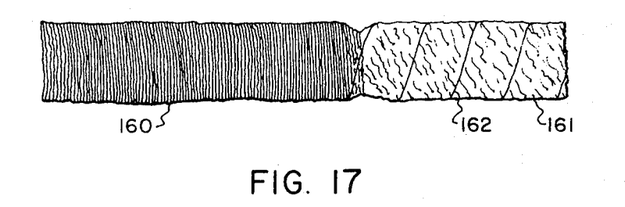
FIG. 17 is a detail view, in elevation, of a shirred strand of casing produced in accordance with this invention.

In the operation of the improved process of this invention, using the apparatus just described, the casing 118 is inflated by introduction of air through hollow mandrel 150, and oil is generally introduced through the mandrel as well to provide lubrication for the casing sliding along the mandrel. The inflated casing 121 is fed through the shirring head and shirred by the apparatus. The casing is accurately metered by rolls 108 and 109 (the drive mechanism for metering roll 108 is not shown). Oil or other lubricant (or water, if the casing is to be moistened) is metered at a predetermined rate to brushes 147 which apply the oil or water to feed belts 127 and 128 and shirring wheels 138 so that the casing is lubricated or moistened as it is shirred. As explained above, the shirring wheels are rotated to cause the shirring lugs 152 to engage the surface of the inflated casing successively along a substantially helical line of contact so that the casing is indented helically and formed into a continuous helical pleat. In FIG. 17 there is shown a strand 160 of shirred casing having continuous helical pleats formed as described above. A portion 161 of the shirred strand is shown in a deshirred or extended position with a line of the helical pleat formation indicated at 162.

Figure 6A:
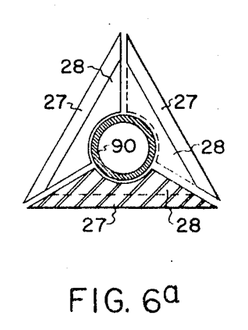
FIGS. 6a, 6b, and 6c are views taken along three different planes showing the relationship of shirring lugs in a 3-wheel or 3-belt apparatus embodying this invention.
Figure 6B:
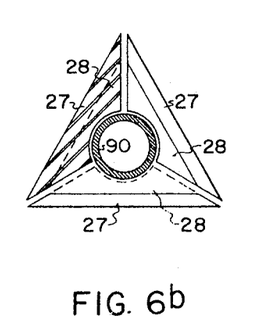
Figure 6C:
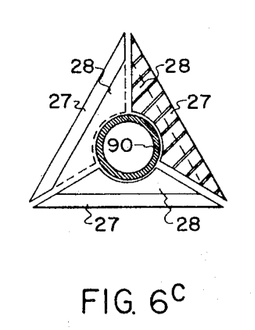

The apparatus described above shows the application of helical shirring to a 3-wheel shirring machine. The principle involved in helical shirring can be utilized in any multiwheel or multibelt shirring apparatus. Thus, the apparatus shown in FIG. 1 utilizes two shirring belts, although three or more shirring belts can be used, particularly as indicated in FIG. 6 of the drawing. Likewise, the apparatus shown in FIG. 2 of the drawings uses three shirring wheels, although an apparatus with two shirring wheels or with four or more shirring wheels would be satisfactory as long as the shirring lugs are set at the desired offset to apply a substantially helical shirring force. As mentioned above, in FIG. 6, there are shown three sections of a 3-belt (or 3-wheel) shirring apparatus. The three shirring belts or wheels 27 are provided with shirring lugs 28. The shirring belts or wheels are positioned equiangularly around shirring mandrel 90. In each of the figures comprising FIG. 6 of the drawings the shirring lug 28 shown in cross section is the one in section at that particular position. The shirring lug 28 shown in full view is the lug which mates with the lug shown in section while the shirring lug shown in dotted lines is the one which will next be moved into position with the one lug shown in full line view.

Figure 15:
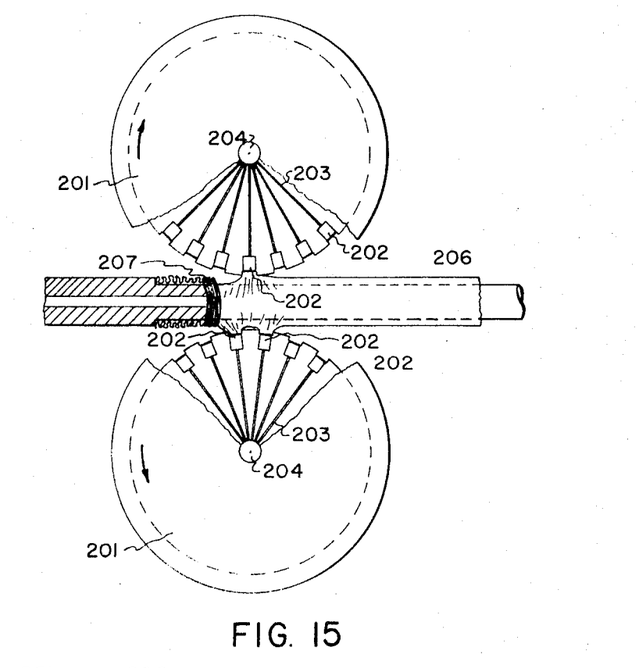
FIG. 15 is a view in broken section showing a modified form of the shirring apparatus applying the principle of the invention to the shirring of casing using vacuum-applied shirring forces.
Figure 16:
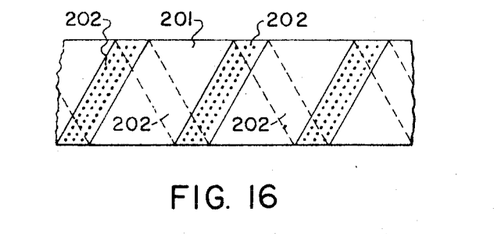
FIG. 16 is a fragmentary plan view of the shirring surface of one of the shirring wheels shown in FIG. 15 and showing in dotted line the location of the shirring vacuum ports on the cooperating wheel.

In FIGS. 15 and 16 of the drawings, the principle of helical shirring is shown as applied to a vacuum shirring apparatus of the type shown in Voigt U.S. Patent 3,209,-399. In the Voigt patent, an apparatus is shown having a pair of shirring wheels with a plurality of apertures arranged for successive application of vacuum to the surface of the casing being shirred. In the Voigt apparatus as the shirring wheels are rotated, a portion of the casing is drawn to the closest vacuum ports and is pulled along by the shirring wheel until the vacuum is cut off and a shirred casing pleat has been formed. The apparatus shown in the Voigt patent arranges for the formation of essentially alternate pleats substantially the same as those produced by the Blizzard et al. patents. In the apparatus shown in FIGS. 15 and 16 of the drawings herein, the principle of helical shirring is applied to a Voigt shirring machine.

In FIG. 15, there are shown a pair of shirring wheels 201, which are partially broken away to show the connection of vacuum ports 202 through passages 203 to the shaft 204 of the shirring wheels through which the vacuum is applied. As the shirring wheels 201 are rotated, the casing 206 is drawn to the vacuum ports 202, as indicated in FIG. 15, and formed into pleats as shown at 207. In the original Voigt apparatus the vacuum ports 202 were arranged for formation of alternate pleats substantially as in the Blizzard et al. apparatus. In this modification of the Voigt apparatus the vacuum ports 202 are offset at an angle as shown in FIG. 16. The offset of the vacuum ports 202 is such that the vacuum ports of the lower shirring wheel, as shown in FIG. 16, mate with the vacuum ports of the upper shirring wheel as shown in FIG. 16 in dotted line, along a substantially helical line. The angular offset of the vacuum shirring ports is such that as the shirring wheels 201 are rotated the casing 206 will be drawn to the vacuum port 202 along a helical line and formed into a helical continuous pleat as the wheels are rotated in the direction of the directional arrows at the wheels.

While the Voigt apparatus, both as originally shown and as modified in FIGS. 15 and 16 herein, discloses the use of two shirring wheels, it should be noted that the apparatus is adaptable to the use of three or four or more shirring wheels with application of the shirring force through vacuum ports on each of the respective wheels.

What is claimed is:
1. An apparatus for shirring synthetic tubular casing comprising a plurality of means to apply a shirring force to casing, said force-applying means being positioned equiangularly around the periphery of the casing being shirred, and said force-applying means including means engageable with the casing to apply a substantially continuous shirring force along a substantially continuous helical line.

2. An apparatus as defined in claim 1 in which said casing-engaging means are each positioned at an angle to the direction of movement of said force-applying means and cooperate to engage the casing along said helical line.

3. An apparatus as defined in claim 2 in which said force-applying means are rotary belts or wheels.

4. An apparatus as defined in claim 3 in which said casing-engaging means comprises lugs on the surface of said belts or wheels positioned to mate along a substantially helical line in contacting casing to shirr the same in a continuous helical pleat.

5. An apparatus as defined in claim 3 in which said belts or wheels are provided with a plurality of ports connected to a source of vacuum and positioned to draw the casing to the surface thereof and move the same to form a shirred pleat, and said ports being positioned to engage said casing along a substantially helical line to form a continuous helical pleat.

6. An apparatus as defined in claim 3 which includes a hollow mandrel on which the casing is shirred and through which compressed air is supplied to inflate the casing prior to shirring.

7. An apparatus as defined in claim 4 in which the lugs on said belts or wheels are equally spaced and have a portion of arcuate shape to define a cylindrical opening when adjacent to the corresponding lug on another belt or wheel, and said lugs being positioned at an angle such that the lugs on adjacent belts or wheels mate successively upon movement to engage the casing along said helical line of contact.

References Cited
UNITED STATES PATENTS

| | | | |
|---|---|---|---|
| 2,819,488 | 1/1958 | Gimbel | 17—42 |
| 2,983,949 | 5/1961 | Matecki | 17—42 |
| 3,209,398 | 10/1965 | Ziolko | 17—42 |
| 3,209,399 | 10/1965 | Voigt | 17—42 |
| 3,245,108 | 4/1966 | Voigt | 17—45 |
| 3,266,911 | 8/1966 | Clement | 99—176 |
| 3,310,833 | 3/1967 | Clement | 17—42 |

LUCIE H. LAUDENSLAGER, Primary Examiner